United States Patent
Midha

[19]

[11] Patent Number: 5,896,694
[45] Date of Patent: Apr. 27, 1999

[54] ADJUSTABLE ICE FISHING TIP-UP

[75] Inventor: Ashok Midha, Rolla, Mo.

[73] Assignee: Maurice Sporting Goods, Inc., Northbrook, Ill.

[21] Appl. No.: 09/027,758

[22] Filed: Feb. 23, 1998

[51] Int. Cl.⁶ .................................................. A01K 85/01
[52] U.S. Cl. ................................................. 43/17; 74/567
[58] Field of Search ................... 43/17, 16, 15; 74/567

[56] References Cited

U.S. PATENT DOCUMENTS

| | | | |
|---|---|---|---|
| D. 282,272 | 1/1986 | Eli | 43/17 |
| D. 311,499 | 10/1990 | Mason | D10/104 |
| D. 317,195 | 5/1991 | Hackel | D22/134 |
| D. 336,507 | 6/1993 | Werner | D22/134 |
| D. 352,543 | 11/1994 | Venable | D22/147 |
| 2,654,176 | 10/1953 | Kachelski et al. | 43/17 |
| 2,720,719 | 10/1955 | Stancheck et al. | 43/17 |
| 2,759,287 | 8/1956 | Urban | 43/16 |
| 2,786,294 | 3/1957 | Whitacre | 43/17 |
| 3,352,048 | 11/1967 | Fleming | 43/17 |
| 3,641,693 | 2/1972 | Pinnow | 43/17 |
| 4,021,958 | 5/1977 | Snodie | 43/17 |
| 4,121,367 | 10/1978 | Gonnello | 43/16 |
| 4,253,262 | 3/1981 | Johnson | 43/17 |
| 4,270,297 | 6/1981 | Yates | 43/4 |
| 4,285,154 | 8/1981 | Grahl | 43/17 |
| 4,310,983 | 1/1982 | Irvin et al. | 43/17 |
| 4,373,287 | 2/1983 | Grahl | 43/17 |
| 4,565,024 | 1/1986 | Maerz | 43/17 |
| 4,566,216 | 1/1986 | Randall | 43/17 |
| 4,633,608 | 1/1987 | Savarino | 43/17 |
| 4,651,460 | 3/1987 | Sykes | 43/17 |
| 4,685,240 | 8/1987 | Fralick | 43/17 |
| 4,718,190 | 1/1988 | Ward et al. | 43/17 |
| 4,727,673 | 3/1988 | Dumar | 43/17 |
| 4,754,532 | 7/1988 | Thomson et al. | 24/303 |
| 4,787,166 | 11/1988 | Vogt et al. | 43/17 |
| 4,790,099 | 12/1988 | Miller, Jr. | 43/17 |
| 4,823,494 | 4/1989 | Waterman | 43/17 |
| 4,845,878 | 7/1989 | Hackel | 43/17 |
| 4,887,777 | 12/1989 | Rasmussen | 242/106 |
| 4,907,363 | 3/1990 | Dury | 43/15 |
| 4,928,419 | 5/1990 | Forrestal | 43/17 |
| 4,942,687 | 7/1990 | Post | 43/17 |
| 4,993,182 | 2/1991 | Monsen | 43/17 |
| 4,996,788 | 3/1991 | Wieting et al. | 43/17 |
| 5,005,310 | 4/1991 | Rinehart | 43/17 |
| 5,044,108 | 9/1991 | Rinehart | 43/17 |
| 5,067,269 | 11/1991 | Eppley et al. | 43/17 |
| 5,097,618 | 3/1992 | Stoffel | 43/17 |
| 5,101,591 | 4/1992 | Frazier et al. | 43/17 |
| 5,107,614 | 4/1992 | Gonnello | 43/17 |
| 5,133,144 | 7/1992 | Formica | 43/17 |
| 5,168,651 | 12/1992 | Wilson | 43/17 |
| 5,224,284 | 7/1993 | Kelsey et al. | 43/17 |
| 5,235,773 | 8/1993 | Rinehart | 43/17 |
| 5,339,558 | 8/1994 | Monsen | 43/17 |
| 5,363,583 | 11/1994 | Brunner | 43/17 |
| 5,448,850 | 9/1995 | Gonnello | 43/17 |
| 5,488,796 | 2/1996 | Taylor et al. | 43/17 |
| 5,564,213 | 10/1996 | Rinehart | 43/17 |

Primary Examiner—Michael J. Carone
Assistant Examiner—Judith A. Nelson
Attorney, Agent, or Firm—Emrich & Dithmar

[57] ABSTRACT

An ice fishing tip-up includes a base frame adapted to span a hole in a layer of ice over a body of water, and carrying a mast which is extendible through the hole into the water. The mast includes a shaft fixed at its lower end to a spool of fishing line and at its upper end to a cam cylinder with a helical groove formed in its outer surface. A signal staff is spring-biased to a raised position and is movable to a lowered position received in one of the convolutions of the helical groove. A pull on the fishing line rotates the cam until the staff reaches the end of the helical groove, releasing it to its raised position, the amount of pull required to trip the staff being adjustable with the cam groove convolution in which it is retained.

15 Claims, 5 Drawing Sheets

ADJUSTABLE ICE FISHING TIP-UP

BACKGROUND OF THE INVENTION

1. Field of the Invention

The present invention generally relates to a tip-up signal device for ice fishing and, in particular, to a tripping mechanism for the signal staff of such a device.

2. Description of the Prior Art

In ice fishing a fisherman frequently leaves a fishing line unattended, extending into the water through a hole in the ice. Accordingly, signaling devices of various types have been used with ice fishing apparatus in order to signal to the fisherman that a fish has taken the hook and pulled the fishing line from the fishing reel. When fishing through a hole in the ice, a retracted signaling device, such as a signal flag, is retained in a non-signaling position by various structural arrangements. A tripping mechanism responds to a pull on the fishing line to trip the retaining structure and release the signal flag for movement to a signaling position. A disadvantage of such prior art signaling devices is that the tripping mechanism is designed so that a predetermined pulling force on the fishing line, or unreeling of a predetermined length of line, will trip the mechanism. But different types of fish and different fishing conditions sometimes make it desirable to allow for different pull forces or different pull lengths to occur before signaling that a fish has actually taken the bait. A disadvantage of prior signaling devices is that they have not allowed for variation of the tripping conditions.

SUMMARY OF THE INVENTION

It is a general object of the invention to provide an improved ice fishing signaling device which avoids the disadvantages of prior such devices while affording additional structural and operating advantages.

An important feature of the invention is the provision of a signaling device of the type set forth, which is adjustable as to the conditions under which signaling will occur.

In connection with the foregoing feature, a further feature of the invention is the provision of a signaling device of the type set forth, with a tripping mechanism which is adjustable as to the fish striking conditions which will cause the mechanism to trip.

A further feature of the invention is the provision of an ice fishing signaling device of the type set forth which is of relatively simple and economical construction.

Certain ones of these and other features of the invention may be attained by providing, in an ice fishing signaling device including a base frame adapted to span a hole cut in a layer of ice overlying a body of water, including a signal staff carried by the base frame for movement between raised and lowered positions and resiliently biased to the raised position, and a fishing line disposable in the water, the improvement comprising: a tripping mechanism coupled to the base frame and to the fishing lines the tripping mechanism including a retaining assembly having a helical groove with an axis and an exit end and disposed, for receiving the staff in the groove and a retaining surface to retain the staff in its lowered position while it is in the groove, and a support assembly mounting the retaining assembly for rotation of the helical groove about its axis in response to a pull on the fishing lines whereby rotation of the helical groove cams the staff along the groove to the exit end thereof and out of engagement with the retaining surface to release the staff for movement to its raised position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
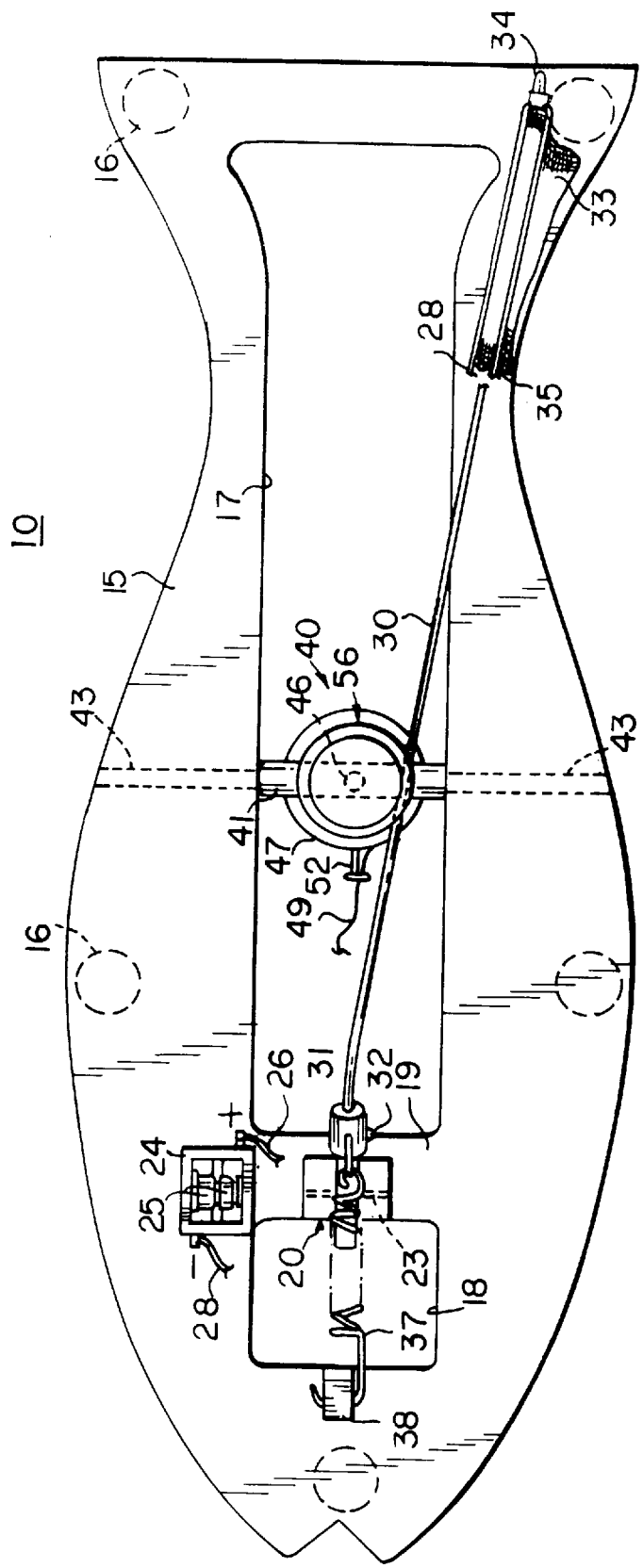
FIG. 1 is a top plan view of an ice fishing tip-up in accordance with the present invention, shown with the signal staff retained in its lowered or non-signaling position.

Referring to the drawings, there is illustrated an ice fishing signaling device in the form of a tip-up 10 having a base frame 15 adapted to span a hole 11 in a layer of ice 12 overlying a body of water 13. In the preferred embodiment, the base frame 15 is a flat, elongated body, which may be formed of wood, plastic or any other suitable material, and has a length sufficient to span the size hole required for the type of fishing to be undertaken. In the illustrated embodiment the base frame 15 is in a decorative shape of a fish outline, but it will be appreciated that it could have any shape. Fixed to the underside of the base frame 15 at spaced-apart locations around the periphery thereof are a plurality of depending support feet 16 for engagement with the upper surface of the ice layer 12. The feet 16 serve to space the body of the base frame 15 above the ice and provide a plurality of substantially point contacts with the ice to facilitate removal of the base frame 15 if the contact points become frozen into the ice. Formed through the base frame 15 is an elongated rectangular opening 17 and a shorter rectangular opening 18, the space therebetween defining a web 19 which is of reduced thickness (see FIGS. 2 and 5) and has a U-shaped notch 19a formed in the forward edge thereof.

Figure 2:
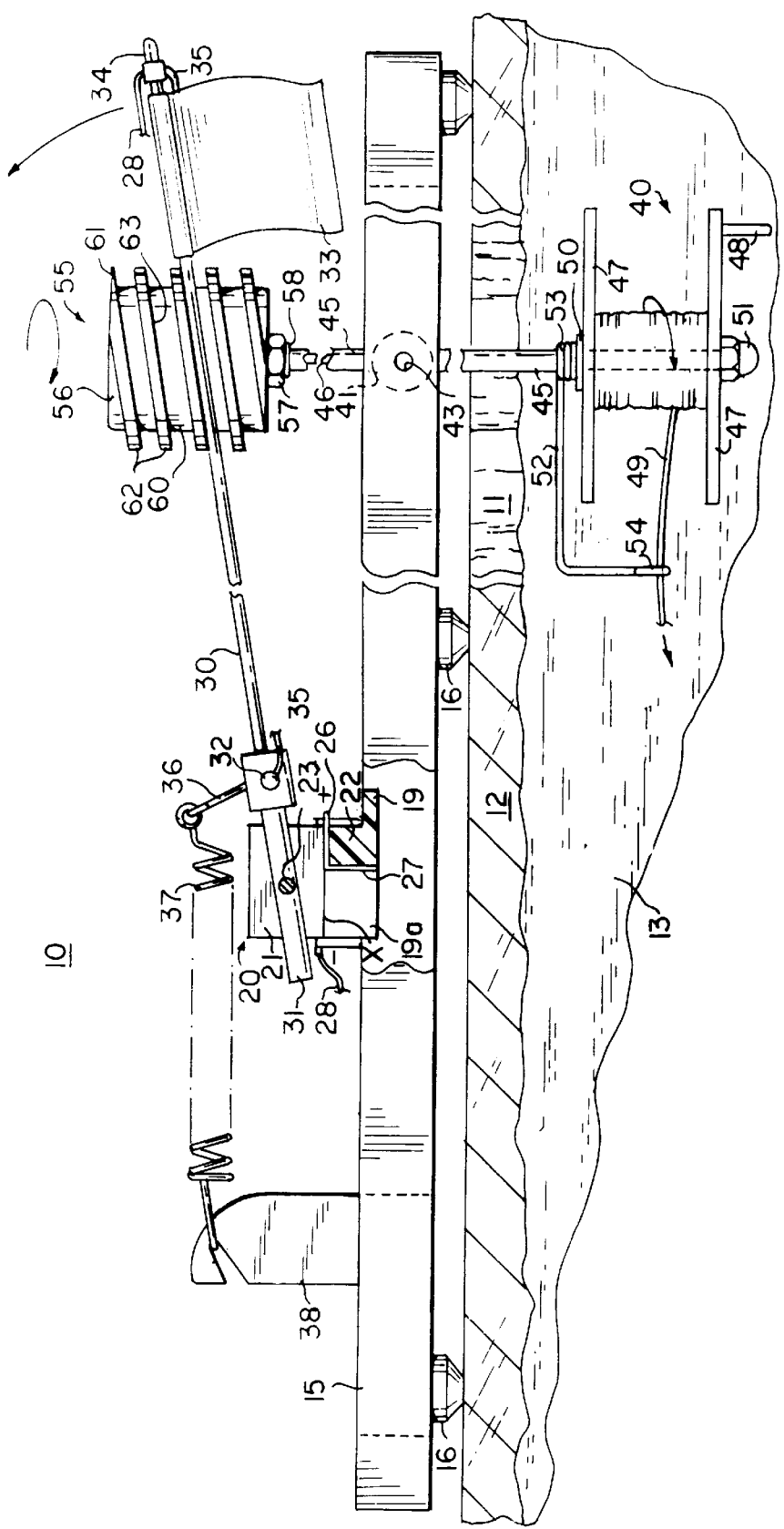
FIG. 2 is an enlarged side elevational view of the tip-up of FIG. 1, shown in position over an ice-fishing hole, and with portions broken away.
Figure 3:
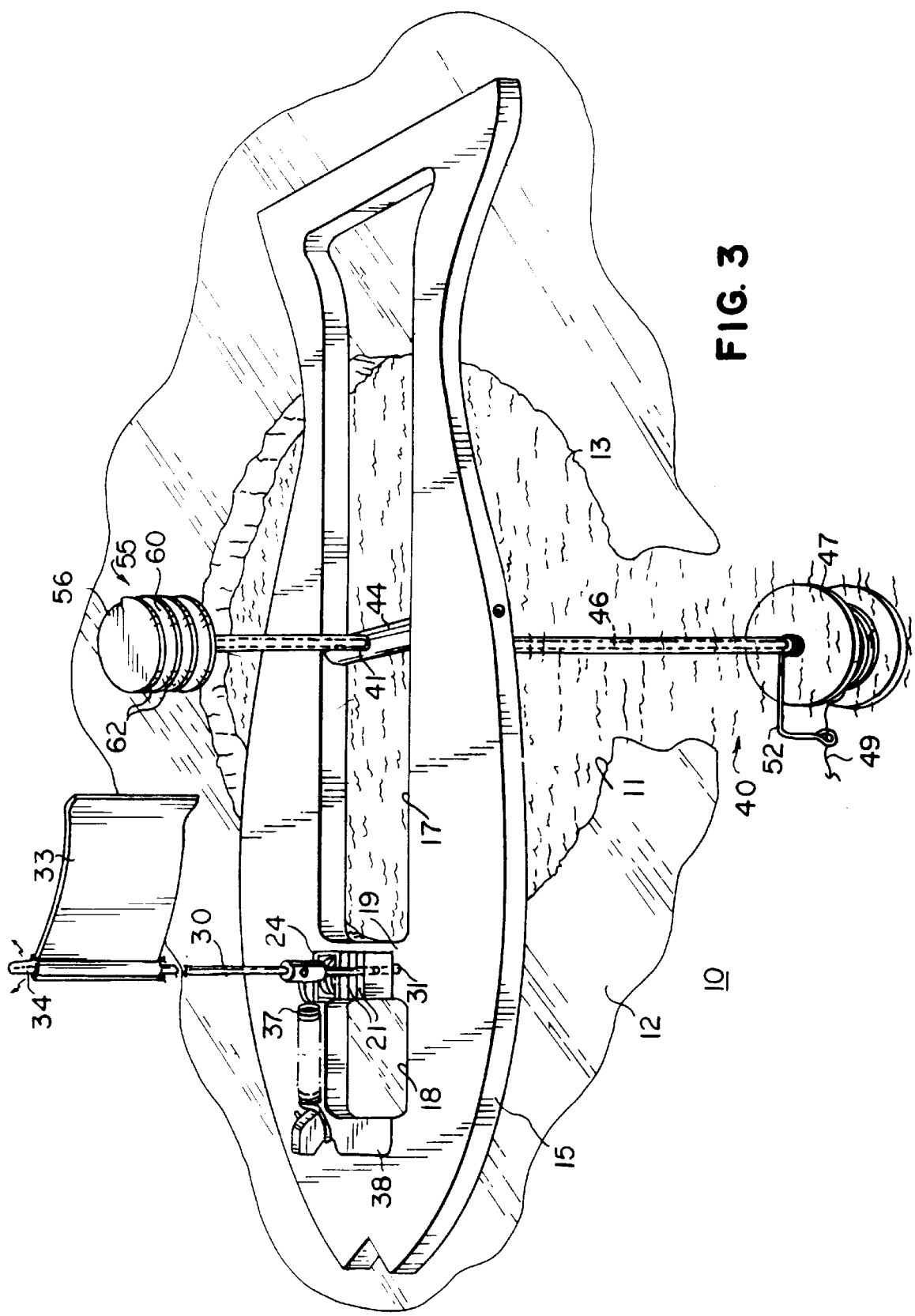
FIG. 3 is a perspective view of the ice fishing tip-up of FIG. 2 with the signal staff in its raised position.
Figure 5:
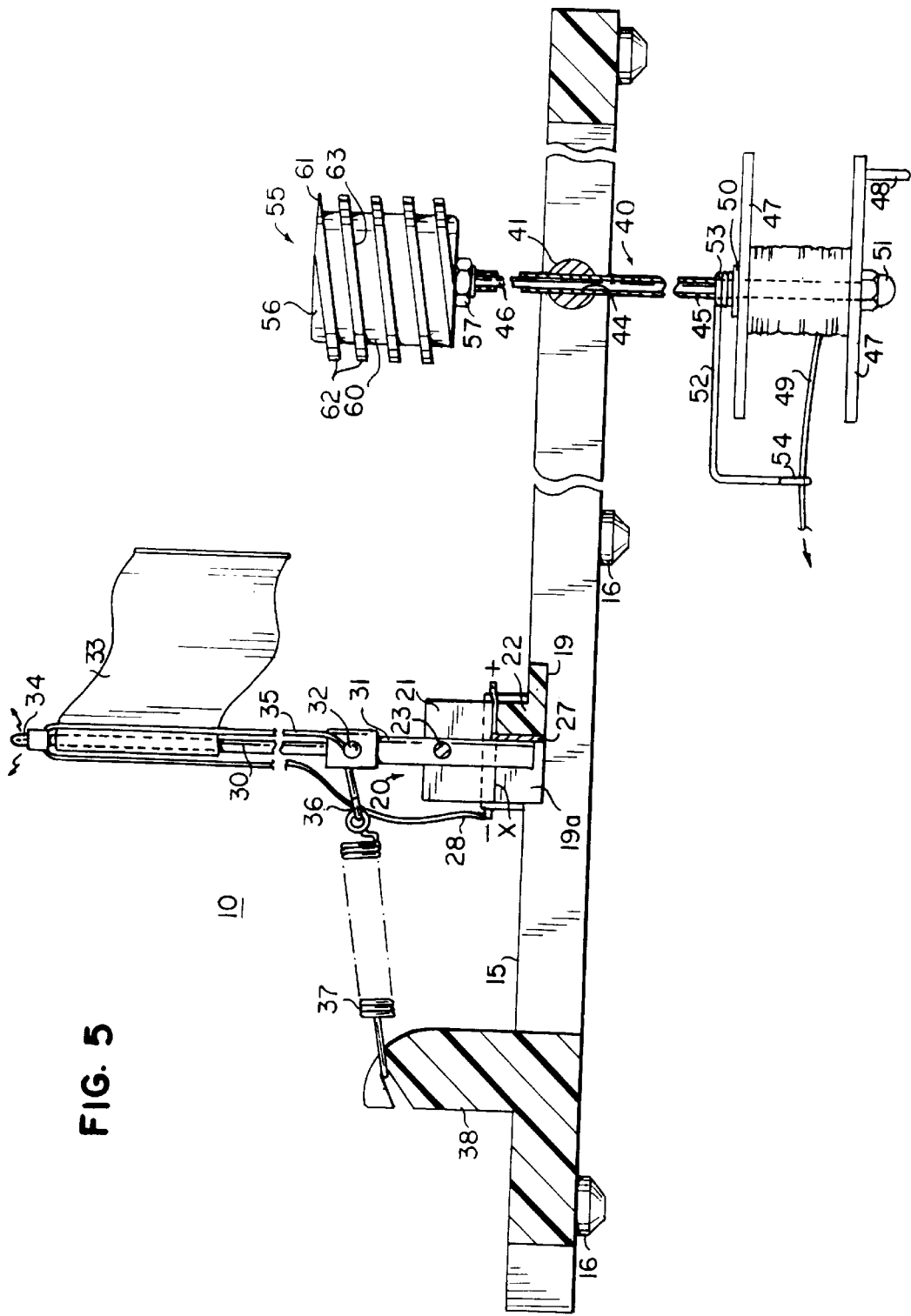
FIG. 5 is a view similar to FIG. 4 with portions in section more clearly to show internal construction

Projecting upwardly from the web 19 is a pivot block 20, which includes a pair of legs 21, respectively disposed on opposite sides of the notch 19a, and a bight 22 joining the legs 21 at the lower rear ends thereof (FIGS. 2, 3 and 5). A pivot pin 23 spans the legs 21 adjacent to their upper ends. While, in the illustrated embodiment, the pivot block 20 has been shown as unitary with the base frame 15, it will be appreciated that it could be a separate structure which is secured by any suitable means to the base frame 15.

Figure 4:
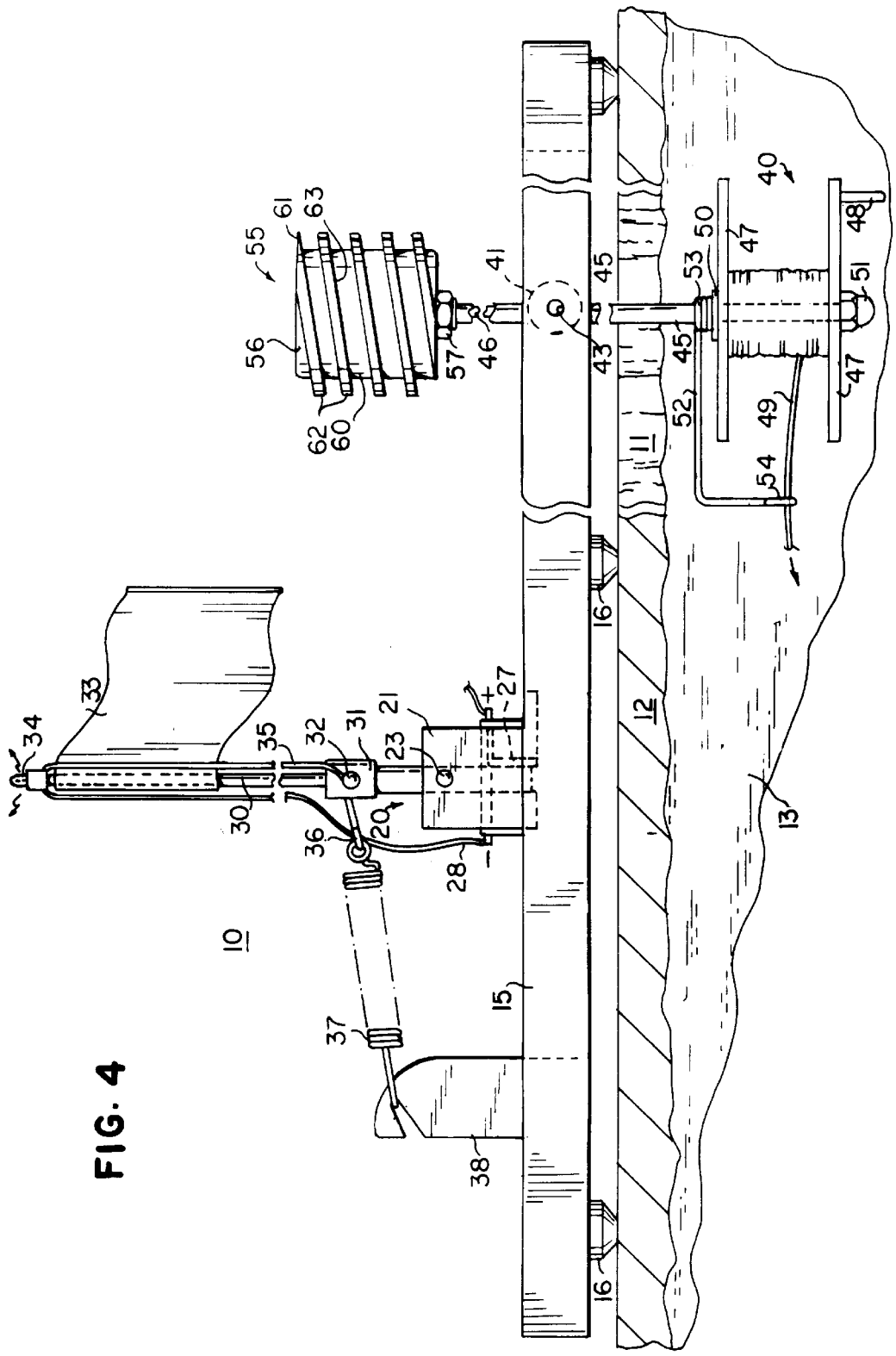
FIG. 4 is a view, similar to FIG. 2, of the tip-up in the position of FIG. 3.

Also mounted on the base frame 15 adjacent to the pivot block 20 at one end of the web 19 is a generally rectangular battery case 24 holding one or more batteries 25, such as camera or watch batteries. The case 24 includes contacts, one of which is connected to a terminal wire 26, which extends behind the pivot block 20, over the bight 22, and has a stripped or uninsulated actuating end 27 which is fitted down inside the rear end of the notch 19a (FIGS. 2 and 5). The other contact of the battery case 24 is connected to a terminal wire 28, which extends upwardly along an elongated signal staff 30. The lower end of the signal staff 30, which is preferably formed of a suitable flexible and resilient material, such as a suitable metal or plastic, is socketed in a pivot socket 31, which receives the pivot pin 23 transversely therethrough for pivotal movement thereon, the staff 30 preferably being fixed in the pivot socket 31, as by a set screw 32. A signaling device, such as a flag 33 or the like, is carried by the distal end of the staff 30, which may also mount a signal lamp 34. The terminal wire 28 extends upwardly along the staff 30 to connect to one terminal of the lamp 34, the other terminal of which is connected to a wire 35 which extends downwardly along the staff 30 and is fixed to the set screw 32, as by soldering or the like. The pivot socket 31 is formed of a suitable electrically conductive material, such as a suitable metal, and has a length such that, when the staff 30 is in its substantially vertical raised position illustrated in FIGS. 3–5, the lower end of the pivot socket 31 is engageable with the actuating end 27 of the terminal wire 26 for closing the circuit across the batteries 25 and energizing the lamp 34. It will be appreciated that when the staff 30 is pivoted from the vertical position, the circuit is broken and the lamp 34 is deenergized.

Preferably, the staff 30 is biased into its raised position by a helical tension spring 37, one end of which is connected to a hook 36 on the pivot socket 31, and the other end of which is connected to a hook 38 upstanding from the base frame 15.

It is a significant aspect of the present invention that the tip-up 10 includes a tripping mechanism 40 for the signal staff 30. More particularly the tripping mechanism 40 includes a pivot shaft 41 extending across the opening 17 of the base frame 15 and secured in place by suitable means such as screws or the like applied through transverse bores 43 in the base frame 15. The shaft 41 has a hole 44 formed diametrically therethrough centrally thereof (FIGS. 3 and 5) and slidably receives therethrough an elongated mast in the form of a hollow tube 45, which may be formed of metal or any other suitable material. An elongated shaft or rod 46 is received coaxially through the tube 45 and is fixed at one end thereof to a spool 47, which is provided with a depending handle 48 and is adapted for storing a supply of fishing line 49. Preferably, the spool 47 is disposed below the lower end of the tube 45, the shaft 46 having a length sufficient to extend through the hub of the spool 47, which is spaced from the tube 45 by a washer 50 and is secured to the shaft 46, as by a cap nut 51 threaded onto the distal end of the shaft 46. A line guide 52 is mounted on the tube 45 by a plurality of spring coils 53 which are loosely mounted on the tube 45, so that the line guide 52 can swing freely in relation to the tube 45 and the spool 47. The lower end of the line guide 52 is in the form of a loop 54, through which the leading end of the fishing line 49 is threaded, all in a known manner.

The other end of the shaft 46 projects outwardly beyond the adjacent end of the tube 45 and is secured to a retaining assembly 55 in the nature of a generally cylindrical cam body 56. Preferably, the cam body 56 is spaced from the adjacent end of the tube 45 by a lock nut 57 and washer 58, the shaft 46 preferably being threadedly engaged through the lock nut 57 and into the lower end of the cam body 56.

Formed in the outer cylindrical surface of the cam body 56 is a helical groove 60, having a pitch and depth sufficient to accommodate the signal staff 30. The helical groove 60 terminates at an exit end 61 at the distal end of the cam body 56 and defines a spiral, radially outwardly extending flange 62, the underside of which defines a retaining surface 63.

In use, the base frame 15 is placed over the ice fishing hole 11 and the tube 45 is pivoted to a substantially vertical orientation so as to extend downwardly through the hole 11 and into the water 13, with the spool 47 being disposed in the water 13, as illustrated in FIGS. 2 and 5. The tube 45 may fall by gravity until the washer 58 rests on the pivot shaft 41 or, alternatively, a set screw (not shown) may be provided in the pivot shaft 41, if it is desired to lock the tube 45 in a predetermined position raised above the pivot shaft 41. The signal staff 30 is then pivoted downwardly and rearwardly, against the urging of the spring 37, to a lowered position illustrated in FIGS. 1 and 2, and is seated in a selected one of the convolutions of the helical groove 60, this cocking of the signal staff 30 being facilitated by its flexible and resilient nature. The force exerted by the bias spring 37 will urge the signal staff 30 against the retaining surface 63 of the flange 62. It is a significant aspect of the invention that the helical groove 60 includes a plurality of convolutions, in any one of which the staff 30 may be selectively retained. In can be seen that the low height of the bight 22 of the pivot block 20 facilitates pivoting of the signal staff 30 to this lowered position.

The fishing line 49 is wound on the spool 47 and threaded through the line guide loop 54 in a manner such that, when a fish strikes and pulls the line the spool 47 will be rotated in the direction of the arrow in FIG. 2, and will correspondingly rotate the shaft 46 and the cam body 56. As the cam body 56 rotates, the signal staff 30 will ride up along the retaining surface 63 until it reaches the exit end 61 of the helical groove 60. At this point the retaining surface 63 disappears and the signal staff 30 is released to be pulled up to its raised position by the spring 37, at which point the lamp 34 will be lit as explained above It will be appreciated that the length of line which must be unspooled before the signal staff 30 is tripped is dependent upon the initial placement of the staff 30 in the helical groove 60. Thus, e.g., the staff 30 could be placed very close to the exit end 61 of the helical groove 60, so that the slightest pull on the fishing line 49 will trip the staff 30, or it could be placed in one of the lower convolutions of the groove 60, necessitating one or more rotations of the cam body 56 before the staff is released.

When the tip-up 10 is not in use, the tube 45 can be positioned and pivoted to a substantially horizontal orientation (not shown), wherein its lower end is against the underside of the rear end of the base frame 15, with the spool 47 against the rear end of the base frame and the cam body 46 disposed in the elongated opening 17. The signal staff may then be pivoted down to a substantially horizontal position and secured to the folded tube 45 and the base frame 15, as by a rubberband or the like, to provide a more compact configuration for storage.

From the foregoing, it can be seen that there has been provided an improved ice fishing tip-up which affords significant adjustability of the length of fishing line which must be unspooled before the signal staff is tripped.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In an ice fishing signaling device including a base frame adapted to span a hole cut in a layer of ice overlying a body of water, including a signal staff carried by the base frame for movement between raised and lowered positions and resiliently biased to the raised position, and a fishing line disposable in the water, the improvement comprising:

a tripping mechanism coupled to the base frame and to the fishing line, said tripping mechanism including a retaining assembly having a helical groove with an axis and an exit end and disposed for receiving the staff in said groove and a retaining surface to retain the staff in its lowered position while it is in the groove, and a support assembly mounting said retaining assembly for rotation of the helical groove about its axis in response to a pull on the fishing line, whereby rotation of said helical groove cams the staff along said groove to the exit end thereof and out of engagement with said retaining surface to release the staff for movement to its raised position.

2. The device of claim 1, wherein said retaining assembly includes a cylindrical member having the helical groove formed in an external cylindrical surface thereof.

3. The device of claim 2, wherein said axis is disposed substantially vertically in use.

4. The device of claim 1, wherein said helical groove includes a plurality of convolutions.

5. The device of claim 1, wherein said tripping mechanism includes a spool carrying a supply of the fishing line, a cylindrical body having an outer cylindrical surface in which the helical groove is formed, and an elongated shaft interconnecting said spool and said cylindrical body for rotation therewith coaxially therewith.

6. The device of claim 5, and further comprising a mounting assembly for mounting said shaft on the base frame for pivotal movement between a substantially vertical use position and a substantially horizontal storage position.

7. The device of claim 1, and further comprising a pivot on the base frame mounting the staff for pivotal movement between its raised and lowered positions.

8. The device of claim 7, and further comprising a bias spring coupled between the staff and the base frame for resiliently biasing the staff to its raised position.

9. In an ice fishing signaling device including a base frame adapted to span a hole cut in a layer of ice overlying a body of water, including a signal staff carried by the base frame for movement between raised and lowered positions and resiliently biased to the raised position, and a fishing line disposable in the water, the improvement comprising:

a tripping mechanism coupled to the base frame and to the fishing line, said tripping mechanism including a shaft having a longitudinal axis and carried by the base frame for rotation about the axis and having a lower end extendable through the hole into the water and an upper end, a spool of the fishing line carried by the lower end of the shaft for rotation therewith, and a cam carried by the upper end of the shaft for rotation therewith and having a helical groove coaxial with the shaft and having an exit end and disposed for receiving the staff in said groove to retain the staff in its lowered position, whereby the shaft is rotatable in response to a pull on the fishing line for camming the staff along said helical groove to the exit end thereof to release the staff for movement to its raised position.

10. The device of claim 9, wherein said helical groove includes a plurality of convolutions.

11. The device of claim 9, and further comprising a mounting assembly for mounting said shaft on the base frame for pivotal movement between a substantially vertical use position and a substantially horizontal storage position.

12. The device of claim 9, and further comprising a tubular sleeve carried by the base frame and receiving the shaft coaxially therein for free rotation relative thereto.

13. The device of claim 12, and further comprising means adjustably supporting said sleeve on the base frame for varying the length of shaft extendible into the water.

14. The device of claim 9, and further comprising a signal less carried by the staff.

15. The device of claim 14, and further comprising a power supply carried by the base frame and responsive to movement of the staff to its raised position for energizing the lamp.

* * * * *

UNITED STATES PATENT AND TRADEMARK OFFICE
CERTIFICATE OF CORRECTION

PATENT NO. : 5,896,694
DATED : April 27, 1999
INVENTOR(S) : Ashok Midha

It is certified that error appears in the above-identified patent and that said Letters Patent is hereby corrected as shown below:

<u>Title page,</u>
Item [56], References Cited, U.S. PATENT DOCUMENTS,
add -- D282,273  1/1986  Eli. --

Signed and Sealed this

Twenty-ninth Day of June, 2004

JON W. DUDAS
*Acting Director of the United States Patent and Trademark Office*